Figure 3:
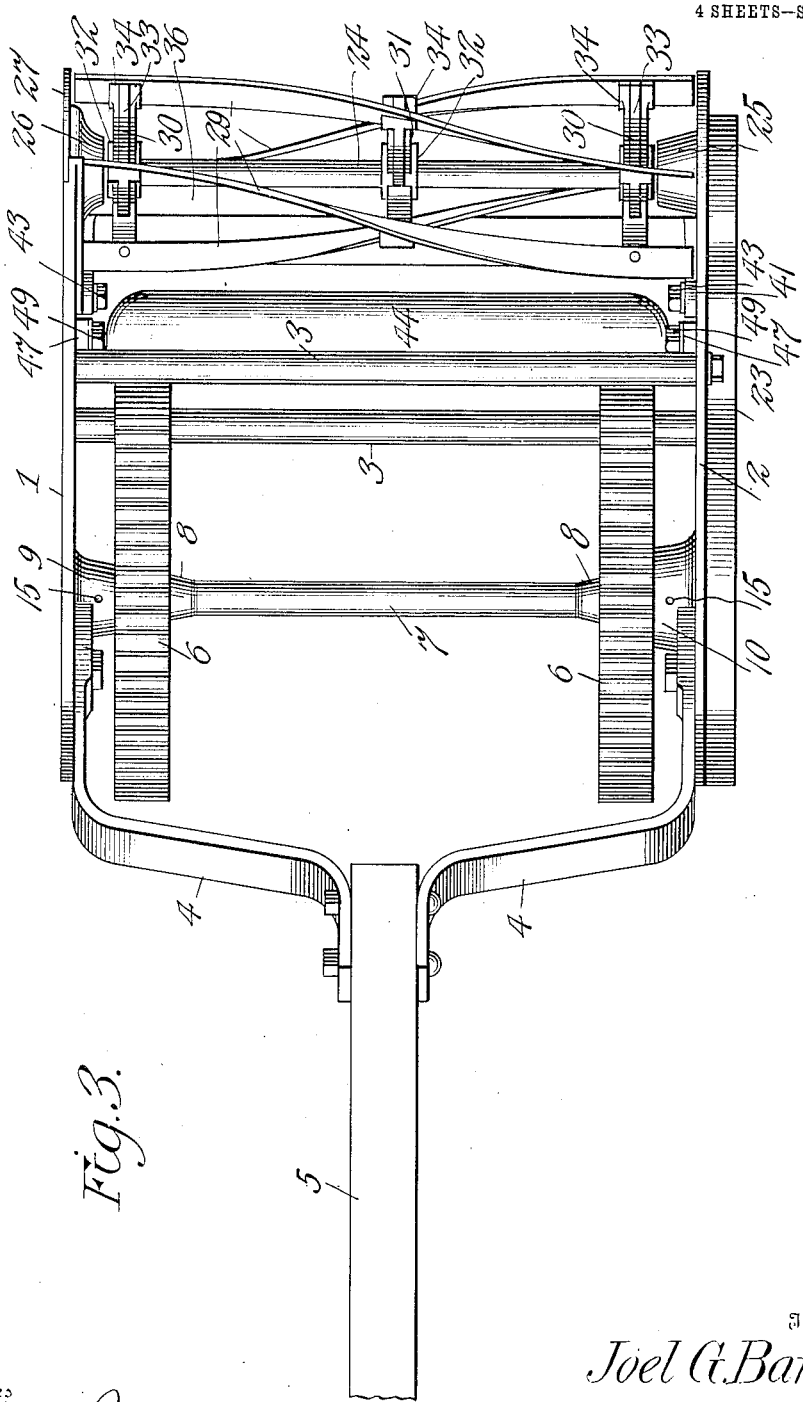

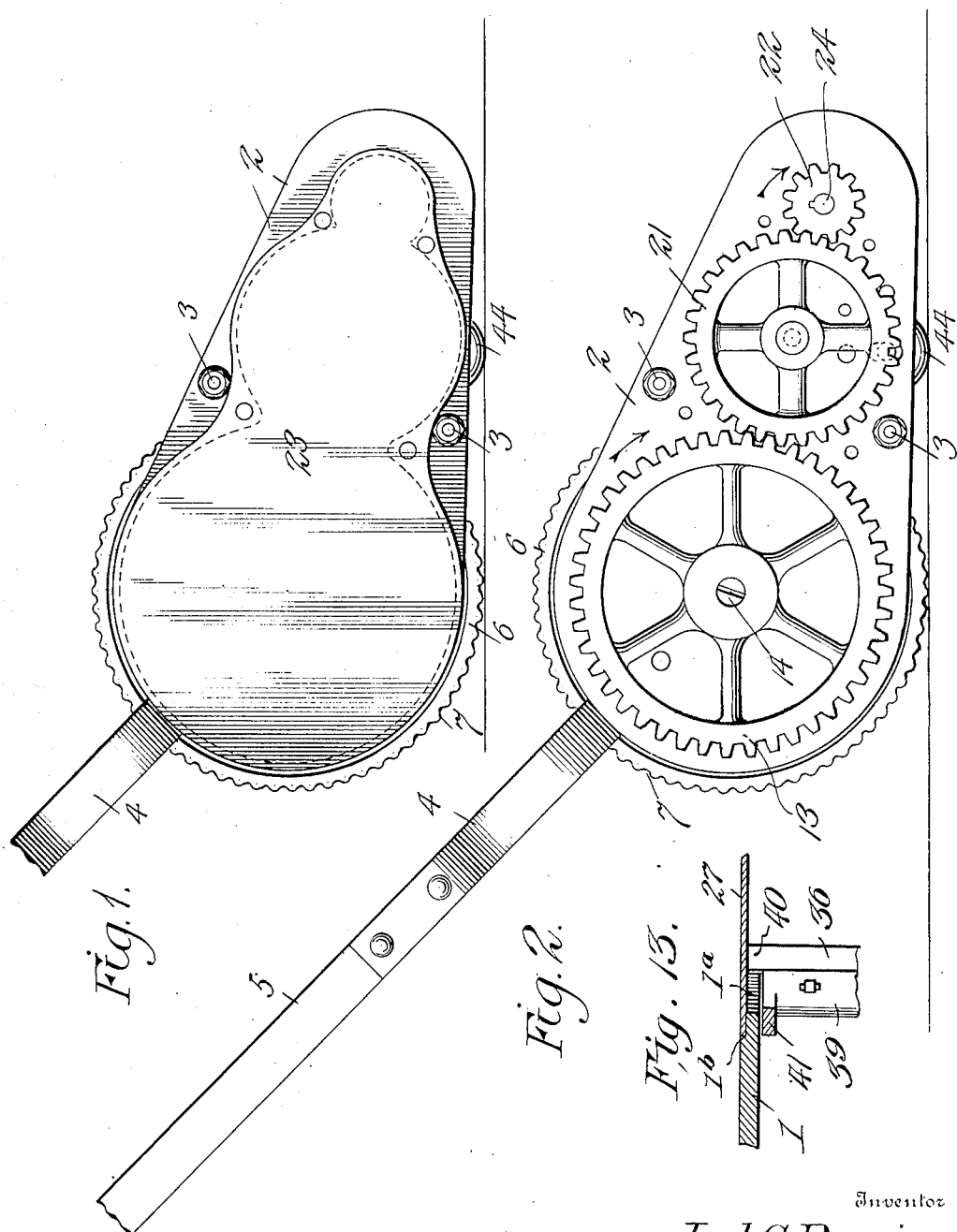

No. 875,977. PATENTED JAN. 7, 1908.
J. G. BARRI.
LAWN MOWER.
APPLICATION FILED DEC. 5, 1906.

4 SHEETS—SHEET 2.

Witnesses
Geo. Ackman Jr.
C. C. Hines.

Inventor
Joel G. Barri.
By Victor J. Evans
Attorney

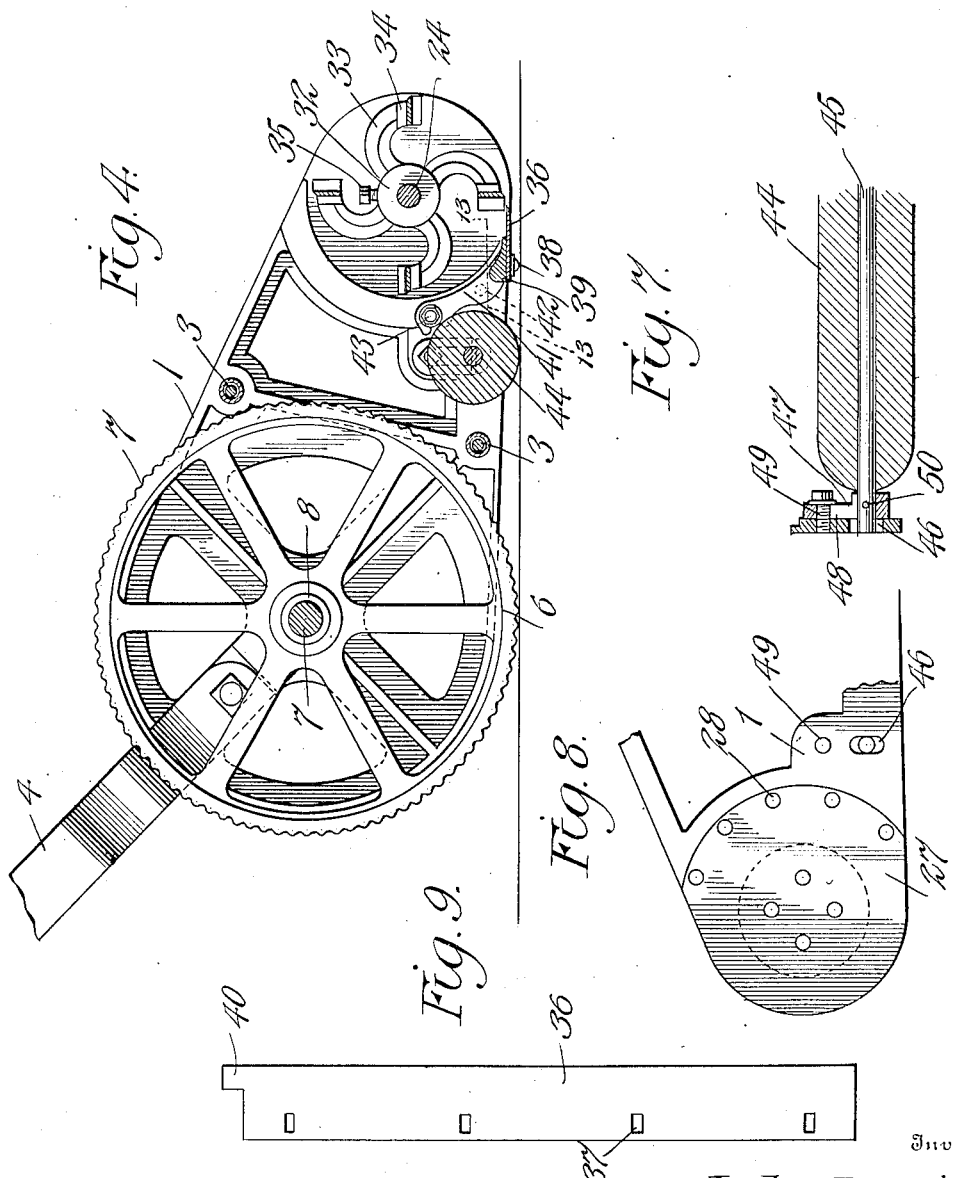

No. 875,977. PATENTED JAN. 7, 1908.
J. G. BARRI.
LAWN MOWER.
APPLICATION FILED DEC. 5, 1906.
4 SHEETS—SHEET 4.
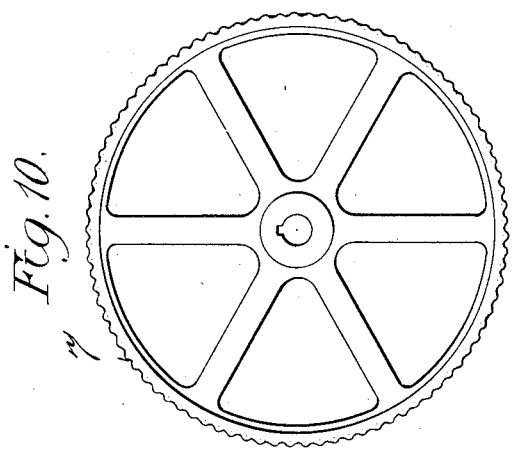
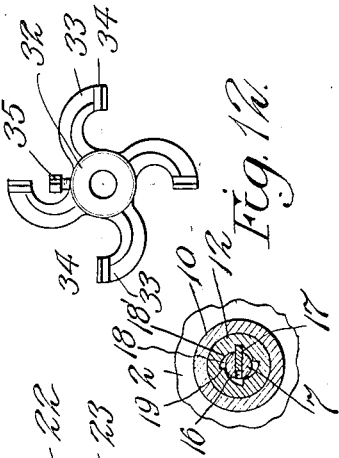
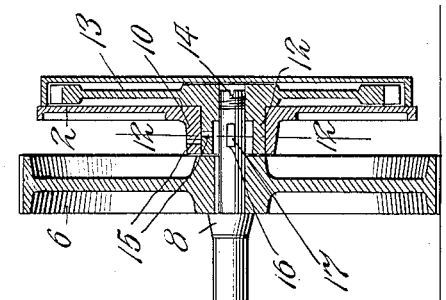
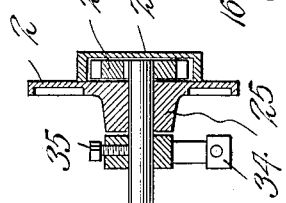
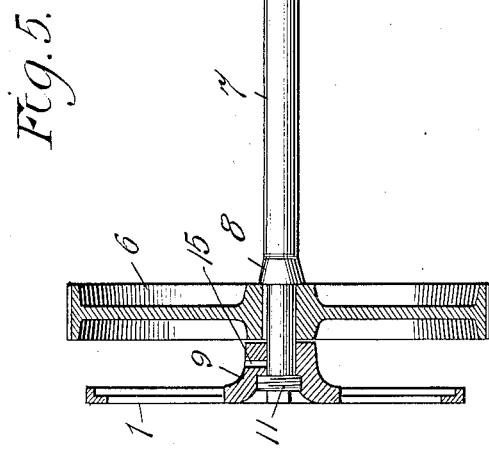
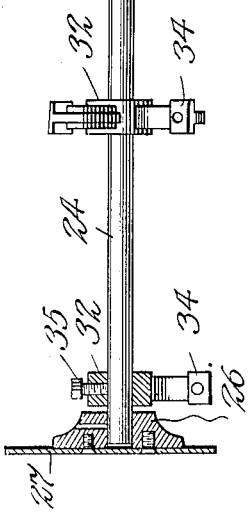
Witnesses
Inventor
Joel G. Barri
By Victor J. Evans
Attorney

UNITED STATES PATENT OFFICE.

JOEL G. BARRI, OF DENVER, COLORADO, ASSIGNOR OF TWO-THIRDS TO MARCUS A. KING AND CHARLES G. HOUSTON, OF DENVER, COLORADO.

LAWN-MOWER.

No. 875,977.   Specification of Letters Patent.   Patented Jan. 7, 1908.

Application filed December 5, 1906. Serial No. 346,454.

*To all whom it may concern:*

Be it known that I, JOEL G. BARRI, a citizen of the United States of America, residing at Denver, in the county of Denver and State of Colorado, have invented new and useful Improvements in Lawn-Mowers, of which the following is a specification.

This invention relates to an improved construction of lawn mower of the type employing a rotary cutting wheel operating in conjunction with a stationary cutting-knife.

The objects of the invention are, first, to provide a mower which will cut close to fences and other border obstructions, and thus serve both as a mower and border trimmer; and, second, to generally simplify and improve the construction and increase the general efficiency of mowers of this class.

In the accompanying drawings,—Figure 1 is a side view of a lawn mower and trimmer embodying my invention. Fig. 2 is a similar view with the gear cap or casing removed. Fig. 3 is a top plan view of the mower. Fig. 4 is a vertical longitudinal section of the same. Fig. 5 is a vertical transverse section through the mower on the line of the axle or shaft of the drive wheels. Fig. 6 is a similar view on the line of the shaft of the cutting wheel, the cutting blades being removed.
Fig. 7 is a vertical longitudinal section through a portion of the ground roller and one side of the frame, showing in detail the means for adjustably mounting the roller. Fig. 8 is a detail side elevation of the forward portion of the left hand side of the frame, showing certain features of construction. Fig. 9 is a plan view of the stationary cutting blade. Fig. 10 is a side view of one of the ground or drive wheels. Fig. 11 is a view of one of the armed knife-supports of the cutting wheel. Fig. 12 is a section on line 12—12 of Fig. 5. Fig. 13 is a section taken substantially on line 13—13 of Fig. 4.

Referring now more particularly to the drawings, the frame of the machine comprises a pair of side plates 1 and 2 coupled at an intermediate point by upper and lower transverse tie bolts 3. These plates are preferably of a skeleton type in order to secure a desired lightness in weight and taper longitudinally from front to rear to provide for the proper mounting of the operating parts, and they are also enlarged, thickened and ribbed or otherwise braced to form supporting portions of the proper size, shape and strength for the operating parts and their securing devices. Yoke straps 4 are suitably connected with the upper rear portions of the plates and to the usual handle bar 5, whereby the machine is manipulated.

Arranged between the frame plates in rear of the transverse center line thereof are ground wheels 6, having their peripheries corrugated or otherwise roughened, as shown at 7, to secure a firm traction engagement with the surface of the ground. These wheels are keyed upon a transverse drive shaft 7, having shoulders 8 against which the inner sides of the hubs of the wheels abut. The ends of the shaft project into hollow bearing bosses 9 and 10 respectively formed upon the frame plates 1 and 2, the left hand end of the shaft being directly journaled in the boss 9 and held from outward movement by a threaded plug 11 arranged within a countersunk socket or opening therein. The right hand end of the shaft enters the hub 12 of a primary driving gear 13 arranged upon the exterior of the frame plate 2 and is journaled to rotate therein, the hub 12 in its turn being suitably extended to enter and rotate in the bearing boss 10. A threaded plug 14 fits within the outer end of the hub 12 and prevents access of dust and grit to the bearing. The parts of the bearings are formed with openings 15 through which oil or a suitable lubricant may be introduced. In the end of the shaft journaled in the hub 12 of the driving gear 13 a transverse slot 16 is formed in which slides a gravity clutch dog 17 adapted to engage clutch recesses 18 formed in the hub 12, each of which said recesses is formed with a curved outer wall 18' and a shoulder 19. The shoulder 19 is arranged at the deep end of the recess, and the wall 18 extends therefrom on such curvature as to intersect or merge into the bore of the hub at its opposite end. This dog and recesses form a clutch connection between the axle and driving gear to lock said gear to the axle when the machine is moved forwardly and to permit the axle to have independent motion when the machine is drawn or moved rearwardly. When the axle turns forwardly the dog drops by gravity into the nearest recess and comes into locking connection with the shoulder 19 thereof, thus coupling the shaft to the gear. When the shaft turns rearwardly the dog simply slides over the curved walls 18, so that the shaft will turn without affecting the drive gear, as will be readily understood.

The drive gear 13 is rotated forwardly by the axle 7 and meshes with and rearwardly rotates an intermediate gear wheel 21, which in turn meshes with and imparts forward rotation to a pinion 22. These gears are arranged, as shown, upon the outer side of the right hand frame plate 2 and are covered by a cap piece or gear casing 23 detachably secured to said frame plate in any suitable manner. The pinion 22 is keyed upon the projecting right hand end of the cutter wheel shaft 24, which end of said shaft is journaled in a bearing boss 25 formed upon the forward end of the frame plate 2. The opposite end of the shaft is journaled in a bearing 26 detachably secured upon a removable supporting plate 27 detachably secured to the forward end of the frame piece 1, as clearly shown in Figs. 6 and 8. In order to mount the plate 27 in an effective manner, the forward end of the plate 1 is concavely curved and recessed in its outer side to form a seat for the rear end of said supporting plate, which latter is of less thickness than the plate 1 and secured thereto by screws or other suitable fastenings 28. It will be observed that by this construction the shaft 24 is insertible and withdrawable longitudinally through the bearings 25 and 26 and is held in position by the pinion 22, which is retained from outward movement by the cap or cover plate 23. The arrangement of the bearings of the rear driving mechanism is also such that upon removing the plugs 11 and 14, the drive shaft and associated bearing elements, as well as the frame pieces, may be disconnected upon the removal of the tie bolts 3. The drive gear 13 is held from outward movement by the cap piece or gear casing 23 and upon removal of the same may be withdrawn, as will be readily understood. By the described mode of mounting the parts, it will be apparent that the same may be readily and conveniently assembled and disassembled.

The cutter wheel is rigidly mounted upon the shaft 24 and comprises a group or series of cutting blades or knives 29 of ordinary form; said blades being mounted upon end and intermediate armed supports or spiders 30 and 31, each comprising a collar 32 carrying arms 33 curved in the direction of rotation of the wheel and provided at their outer ends with seat faces 34 for the cutting blades. The collars 32 may be fixed to the shaft 24 in any preferred manner, as by the use of set screws 35. In practice the cutting knives or blades are so shaped as to present their cutting edges tangent to the periphery of the cutting wheel, with their cutting faces attached radially to the spiders at an angle of about eight degrees, and have an angular turn of about 85 degrees with a left side advance. The ends of the blades terminate close to the side frame plates 1 and 2 and extend beyond or outside of the planes of movement of the ground or drive wheels 6.

The cutting wheel operates in conjunction with a stationary cutting knife or blade 36 provided along its rear edge with a series of slots 37 for the passage of screws or analogous fastenings 38 which secure the same to a transverse carrier bar 39 in such a manner as to permit forward or rearward movement of said blade to adjust the cutting edge thereof relatively to the path of circular movement of the cutting blades of the cutting wheel. At its left hand end the cutting portion of the blade 36 is formed with an extension 40 which lies in front of the front curved portion of the frame plate 1 and carries the cutting surface of the blade 36 into close juxtaposition to the inner face of the supporting plate 27, by which construction the cutting devices are adapted to operate close up to the extreme boundary of the left hand side of the frame, thus adapting the machine to be run close to fences and other border obstructions and to serve the function of a border trimmer as well as a mower.

The bar 39 is fixed to the lower ends of hanger arms 41, each having a pivot stud or projection 42 turning in bearing openings in the frame plates, thus permitting the stationary cutter as a whole to swing in the arc of a circle on the frame for additional adjustment relative to the cutting wheel. The upper ends of the pivoted hanger arms 41 are hooked or slotted to engage bolts 43, whereby they are detachably secured to the frame plates.

The forward portion of the frame is supported by a ground roller 44 journaled on a shaft or axle 45, the ends of which are fitted for vertical movement in slots 46 formed in enlarged or thickened portions of the plates. The roller is supported by links or brackets 47 having vertical slots 48 through which pass clamping screws 49 carried by the frame plates, such slots permitting of the vertical adjustment of the brackets on the screws to enable the roller to be raised and lowered to vary the elevation of the frame for different heights of cut. The brackets are disposed on the inner sides of the frame plates and the ends of the shaft pass therethrough and are fixed thereto by pins or other fastening connections 50.

From the construction shown and described it will be apparent that upon the forward movement of the machine the cutter wheel will be propelled in a forward direction so that the blades thereof will serve the function of gatherers to sweep the blades of grass into contact with the cutting edge of the stationary blade, and will consequently coact with said stationary blade to sever the grass in a more cleanly and efficient manner than is possible with the cutting mechanisms of rotary mowers of ordinary construction. It will also be seen that the construction of the cutting devices and adjacent frame parts is such as to permit the cutters to operate to an extended degree close to one side of the frame, thus rendering the apparatus available for use as an effective edge trimmer. The construction employed further provides for the convenient assemblage and disassemblage of the parts in building and repairing the mower, as will be readily understood.

Having thus described the invention, what is claimed as new, is:—

1. In a lawn mower, a frame including side pieces, said side pieces being provided with bearing bosses, ground wheels between the side pieces, a shaft carrying said wheels, said shaft being journaled at one end in the bearing boss of one of the side pieces and projecting at its opposite end through the bearing boss on the other side piece, an external drive gear having a hub entering the latter named boss and forming a journal for the projecting end of the shaft, clutch mechanism between said hub and shaft to permit the shaft to turn independently of said gear in one direction, stationary and rotary cutters, and gearing between the rotary cutter and the drive gear.

2. In a lawn mower, a frame having side pieces provided with bearing bosses, a drive gear having a hub journaled in one of said bearing bosses, an axle journaled at one end in the other bearing boss and at its opposite end in the hub of the gear, said hub being provided with clutch teeth, a dog on the axle coöperating with said clutch teeth, stationary and rotary cutting members supported by the frame, and means for operating the rotary cutting member from the drive gear.

3. In a lawn mower, a frame having side pieces provided with bearing bosses, a drive gear having a hub journaled in one of said bearing bosses, an axle journaled at one end in the other bearing boss and at its opposite end in the hub of the gear, said hub being provided with clutch teeth, a dog on the axle coöperating with said clutch teeth, plugs closing the outer ends of the hub and the second named bearing boss, stationary and rotary cutting members supported by the frame, and means for operating the rotary cutting member from the drive gear.

4. In a lawn mower, a frame comprising side plates provided with inwardly extending bearing bosses, a drive gear arranged on the outer side of one of said plates and having a hub journaled in the bearing boss thereof, said hub being provided with internal clutch teeth, an axle journaled at one end in the bearing boss of the other frame plate and at its other end in the hub of the gear, said axle being provided with shoulders, ground wheels keyed on the axle between said shoulders and the respective bearing bosses, a dog upon the axle coöperating with the clutch teeth on the gear hub, detachable plugs closing the outer ends of the hub and boss in which the axle is journaled, stationary and rotary cutting members supported by the frame, and means for operating the rotary cutting member from the drive gear.

5. In a lawn mower, a frame having bearings, a drive gear having a hub journaled in one of the bearings and provided with internal ratchet teeth, an axle journaled at one end in the other bearing and at its opposite end in the hub of the gear, said axle being provided with a transverse slot, a gravity dog slidably mounted in said slot to coöperate with said ratchet teeth, ground wheels mounted on the axle, stationary and rotary cutting members supported by the frame, and means for operating the rotary cutting member from the drive gear.

6. In a lawn mower, a frame comprising side plates, one of said side plates being provided with a front portion of reduced thickness having its inner face lying in a plane outwardly beyond the plane of the inner face of the unreduced portion of said plate, an axle journaled at the rear of the frame, ground wheels carried by the axle, a shaft journaled at the front of the frame, a rotary cutter carried by the shaft, gearing for driving the shaft from the axle, and a stationary cutter plate supported by the frame plates for coöperation with the rotary cutter, said cutter plate being provided at one end with a longitudinal extension from its cutting edge projecting in front of the forward edge of the unreduced portion of the aforementioned side plate close to the inner face of the reduced front portion thereof.

7. In a lawn mower, a frame comprising side plates, one of said plates being cut away or having a portion removed at its forward end, a detachable bearing plate of less thickness than said frame plate and secured thereto, a shaft journaled in the opposite frame plate and detachable bearing plate, a stationary cutting knife supported by and extending between the frame plates, said knife having its cutting surface extended at one end to project in front of the cut-away frame plate in close proximity to the detachable bearing plate, cutting blades mounted on the shaft, and drive gearing carried by the frame for rotating said shaft.

8. In a lawn mower, a frame comprising side plates, one of said plates being segmentally cut away at its forward end and provided in its outer side with a recess, a detachable bearing plate having its rear edge seated in said recess and secured to the frame plate, said bearing plate being of less thickness than the frame plate, a shaft journaled in said bearing plate and the opposite frame plate, cutting knives carried by the shaft, a stationary cutting knife supported by and extending between the frame plates and having its cutting edge extended at one end in front of the cut-away frame-plate and in proximity to the bearing plate, and drive gearing on the frame for rotating the shaft.

In testimony whereof, I affix my signature in presence of two witnesses.

JOEL G. BARRI.

Witnesses:
 MARCUS A. KING,
 CHARLES G. HOUSTON.